United States Patent [19]

Messenger

[11] 3,801,111

[45] Apr. 2, 1974

[54] SHAFT SEAL

[75] Inventor: Edward J. Messenger, Gastonia, N.C.

[73] Assignee: Garlock, Inc., Palmyra, N.Y.

[22] Filed: Mar. 27, 1972

[21] Appl. No.: 238,064

[52] U.S. Cl. ...................... 277/58, 277/65, 64/32 F
[51] Int. Cl. ............................................. F16j 15/38
[58] Field of Search............ 277/65, 58, 50; 64/32 F

[56] References Cited
UNITED STATES PATENTS
| | | | |
|---|---|---|---|
| 3,563,556 | 2/1971 | Scott | 277/65 |
| 2,714,023 | 7/1955 | Hennessy | 277/58 |
| 2,983,125 | 5/1961 | Peickii et al. | 64/32 F |

Primary Examiner—Samuel B. Rothberg
Attorney, Agent, or Firm—Schovee & Boston

[57] ABSTRACT

A seal for use between a housing bore and a rotating and reciprocating shaft and including an annular metal case supporting an elastomeric sealing member in rotary contact with the shaft and also supporting an elongated, shaft-encircling, boot-like, elastomeric collapsible sleeve. The proximal end of the sleeve includes an enlarged bead and the metal case includes an annular groove in which the bead is mechanically crimped. The bead-retaining portion of the metal case is located axially and radially outward from a cylindrical bore-fitting portion of the metal case.

8 Claims, 2 Drawing Figures

PATENTED APR 2 1974  3,801,111

3,801,111

SHAFT SEAL

BACKGROUND OF THE INVENTION

This invention relates to a fluid seal for use between a housing bore and a rotating and reciprocating shaft, and in a preferred application to automotive rear transmission seals.

Automotive transmission seals including a metal case supporting a radial shaft seal and an elongated boot-like collapsible sleeve are known.

SUMMARY OF THE INVENTION

A seal for sealing between a housing bore and a rotating and reciprocating shaft including a metal case, a shaft seal bonded to a radial flange of the case and an elongated boot-like collapsible sleeve connected to the case by an enlarged annular bead on the sleeve being received in an annular groove in the metal case which case is then mechanically crimped over the bead to hold the sleeve to the case. The groove is axially and radially outward from a cylindrical bore-engaging portion of the metal case.

BRIEF DESCRIPTION OF THE DRAWINGS

The present invention will be more fully understood when read in conjunction with the attached drawings, wherein like reference numerals refer to like elements, and wherein.

DETAILED DESCRIPTION OF THE PREFERRED EMBODIMENT

Figure 1:
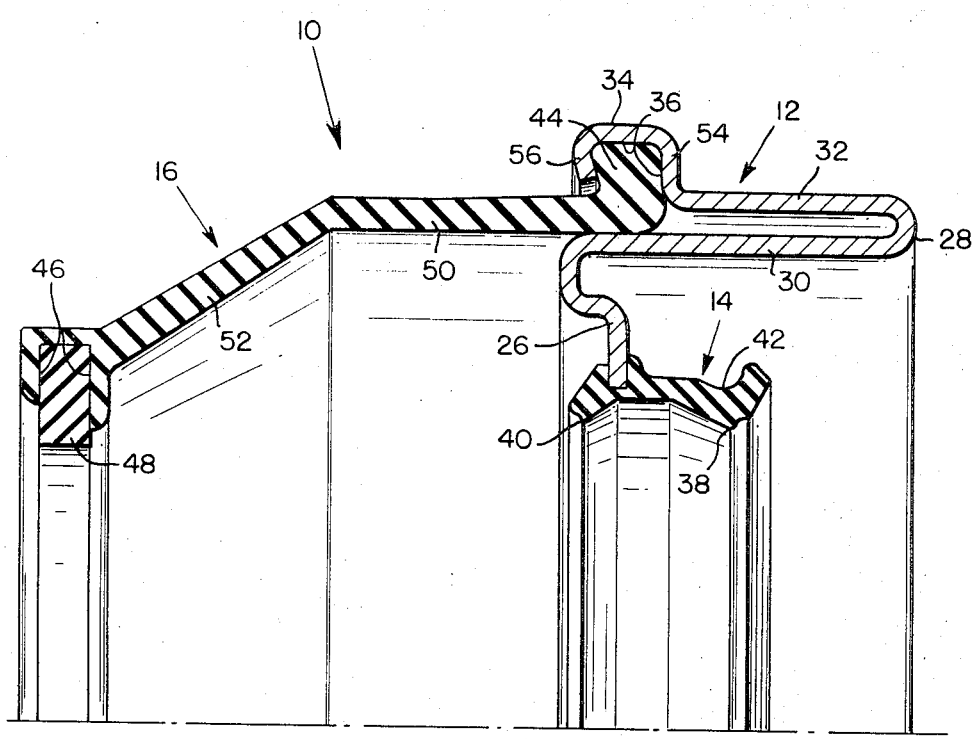
FIG. 1 is an enlarged cross-sectional, fragmentary view of the fluid seal of the present invention.

Referring now to FIG. 1 of the drawing, the fluid seal 10 of the present invention comprises a metal case 12, a shaft-engaging sealing member 14, and an elongated, boot-like collapsible sleeve 16.

Figure 2:
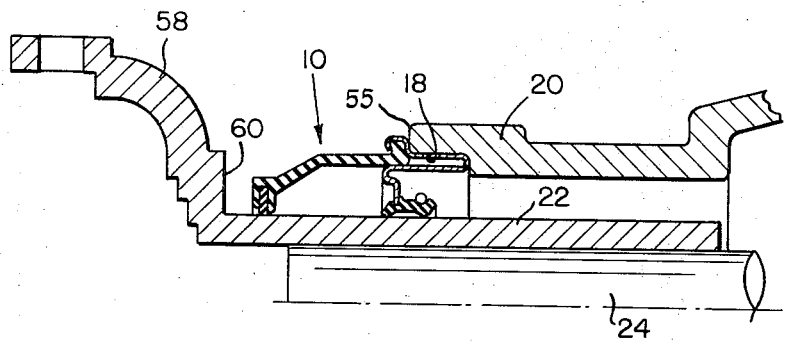
FIG. 2 is a partly broken away side view of the fluid seal of FIG. 1 as installed in a preferred application thereof.

FIG. 2 shows the seal 10 installed in a preferred embodiment in a bore 18 of a transmission housing 20 to provide a seal between the housing 20 and a sleeve 22, splined or otherwise connected to and rotating with a shaft 24.

The metal case 12 includes a radially inwardly extending flange 26, a cylindrical portion 28 comprising a pair of concentric adjacent cylindrical elements 30 and 32, and an annular bead-retaining portion 34 encompassing an annular bead-retaining groove 36. The bead-retaining portion 34 is formed by axially outer extensions (i.e., axially beyond said cylindrical portion 28) of said pair of elements 30 and 32, with the extension of the outer element 32 including an abutting flange 54 and a locking (crimping) flange 56. The outside cylindrical surface of the outer element 32 is adpted to engage in the bore 18 of the housing 20 in a leakproof press fit therein.

The sealing member 14 can be any known type of elastomeric shaft seal for rotary sealing engagement with the sleeve 22 and can include, for example, a main fluid sealing lip 38 and a dust lip 40. An annular groove 42 can be provided in the member 14 for retaining a garter spring (not shown) as is known in the art. The shaft sealing member 14 can be bonded to the flange 26 in any well-known manner.

The sleeve 16 includes an enlarged bead 44 at the proximal end thereof connected to the case 12, and includes an annular groove 46 in the other (distal) end thereof in which a ring 48 is retained and bonded to the sleeve 16, for light sliding contact with the encircled sleeve 22. The ring 48 is preferably of a relatively stiff rubber material as is known in the art. The sleeve 16 further includes a relatively cylindrical portion 50 and a conical portion 52 tapering radially inwardly from the cylindrical portion 50 to the ring 48. The portions 50 and 52 each taper in thickness from a relatively larger thickness at their ends to a relatively smaller thickness where the two portions meet. This construction allows the sleeve 16 to properly axially collapse (by moving or folding radially outwardly) when necessary, without the sleeve 16 moving radially inwardly into contact with the encircled sleeve 22. A universal joint member 58 that rotates with the shaft sleeve 22 includes a surface 60 that contacts the sleeve 16 upon movement of the member 58 toward and away from the housing 20; it is this reciprocating movement of the shaft 24 (and associated members 22 and 58) that causes the sleeve 16 to axially collapse or compress, and it is the tapering thickness of the sleeve portions 50 and 52 that provides for such axial compression by folding radially outwardly rather then inwardly into contact with the shaft sleeve 22. The groove 46 is not essential; the ring 48 can simply be bonded to the distal end of the sleeve 16.

The bead-retaining portion 34 of the metal case 12 includes a radially outwardly extending abutting flange 54 that contacts a wall 55 of the housing 20 to prevent overinsertion of the seal 10 therein and to properly locate or position the seal 10 in the bore 18. The bead-retaining portion 34 also includes a locking flange 56 that is mechanically crimped over the bead 44 to hold the sleeve 16 to the metal case 12. The degree of mechanical crimping necessary to hold the bead 44 in the groove 36 does not affect the dimensions of the outside diameter of the cylindrical portion 32. Any pounding force driving the seal 10 into the bore 18 also serves to tighten the hold of the case 12 on the bead 44 of the sleeve 16.

The bead-retaining portion 34 of the metal case 12 is located axially and radially outward from the cylindrical portion 28 (axially outward being with reference to being outside of the hosing 20). The inner element 30 extends axially outward beyond the edge of the housing 20 to define a portion of the groove 36.

The invention has been described in detail with particular reference to the preferred embodiment thereof, but it will be understood that variations and modifications can be effected within the spirit and scope of the invention as described hereinabove and as defined in the appended claims.

I claim:

1. A seal for sealing between a housing bore and a rotating and reciprocating shaft extending through the housing bore, said seal comprising:
    a. an annular metal case formed as a single element and having a cylindrical portion adapted to press-fit in said bore,
    b. an elastomeric shaft seal bonded to said case and in sealing contact with said shaft, and
    c. an elongated, axially collapsible, shaft encircling, elastomeric sleeve connected to said case and extending axially outwardly from said housing and having a distal end in light contact with said shaft, said sleeve including an enlarged bead at its proximal end adjacent said case, said bead being mechanically crimped in a bead-retaining portion of said case including a bead-retaining groove, and said bead-retaining portion of said case extending radially and axially outwardly from said cylindrical portion.

2. An apparatus according to clam 1 wherein said sleeve tapers in thickness from a larger thickness adjacent each end to a smaller thickness intermediate the ends.

3. An apparatus according to claim 2 wherein said cylindrical portion of said metal case includes a pair of adjacent, concentric cylindrical elements, said bead-retaining portion being formed by axially outer extensions of said pair of elements, and with the extension of the outer cylindrical element including a radially outwardly directed abutting flange for contacting said housing to locate said seal therein.

4. In a seal for sealing between a housing bore and a rotating and reciprocating shaft extending through said bore, and including a metal case press-fitted into said bore and supporting a lip seal bonded to said base and in rotary contact with said shaft, and also supporting an elongated shaft-encircling, axially collapsible, sleeve extending axially outwardly from said housing and having a distal end in light rotating and reciprocating contact with said shaft, the improvement wherein said metal case includes a cylindrical portion adapted to be fitted into said bore, a radially inwardly extending portion to which said lip seal is bonded, and a bead-retaining portion defining an annular groove for receiving an enlarged annular bead at the proximal end of said sleeve, said bead-retaining portion including an outer flange crimped over said bead for holding said bead in said groove, said bead-retaining portion positioned completely axially outwardly from said cylindrical portion received in said housing bore, and said bead-retaining portion extending radially outwardly from said cylindrical portion and including a radially outwardly extending abutting flange for contacting said housing for defining the location of said metal case in said housing.

5. An apparatus according to claim 4 wherein said sleeve tapers in thickness from a larger thickness adjacent each end to a smaller thickness intermediate the ends.

6. An apparatus according to claim 5 wherein said cylindrical portion of said metal case includes a pair of adjacent, concentric cylindrical elements, said bead-retaining portion being formed by axially outer extensions of said pair of elements, and with the extension of the outer cylindrical element including a radially outwardly directed abutting flange for contacting said housing to locate said seal therein.

7. A seal for sealing between a housing bore and a rotating and reciprocating shaft extending through the housing bore, said seal comprising:

a. an annular metal case including:
    i. a cylindrical portion adapted to fit in leak tight engagement with a housing bore through which said drive shaft extends,
    ii. a radially inwardly extending flange portion connected to said cylindrical portion, and
    iii. an annular bead-retaining groove positioned axially outwardly from said housing beyond said cylindrical portion,
  b. an elastomeric shaft seal bonded to said flange and adapted to provide rotary sealing contact with said shaft, and
  c. a hollow cylindrical, shaft encircling sleeve seal connected to said case and extending axially outwardly therefrom away from said housing, said sleeve including:
    i. an enlarged bead at the end thereof connected to said case,
    ii. a hollow cylindrical section connected to said bead,
    iii. a hollow conical section connected to said cylindrical section,
    iv. an enlarged end portion connected to the conical section and having an annular groove therein,
    v. said sections tapering in thickness from a larger thickness adjacent their outer ends to a thinner thickness at their meeting,
    vi. an annular ring of hard material positioned in said groove and bonded thereto, and
  d. said case being crimped around said bead for holding said bead in said groove.

8. An apparatus according to claim 7 wherein said cylindrical portion includes a pair of adjacent, concentric cylindrical elements with said bead-retaining portion being defined therebetween and with an abutting flange formed from the outer cylindrical element and with the inner cylindrical element extending axially outwardly beyond said abutting flange and defining a portion of said groove, said abutting flange adapted to contact said housing to locate said seal therein.

* * * * *

UNITED STATES PATENT OFFICE
CERTIFICATE OF CORRECTION

Patent No. 3,801,111     Dated April 2, 1974

Inventor(s)   Edward J. Messenger

It is certified that error appears in the above-identified patent and that said Letters Patent are hereby corrected as shown below:

Column 3,
Claim 2 line 9, "clam" should read --claim--.

Column 4,
Claim 7(c)

line 24, after the word sleeve insert --seal--.

Signed and sealed this 29th day of October 1974.

(SEAL)
Attest:

McCOY M. GIBSON JR.
Attesting Officer

C. MARSHALL DANN
Commissioner of Patents